Patented Dec. 4, 1951

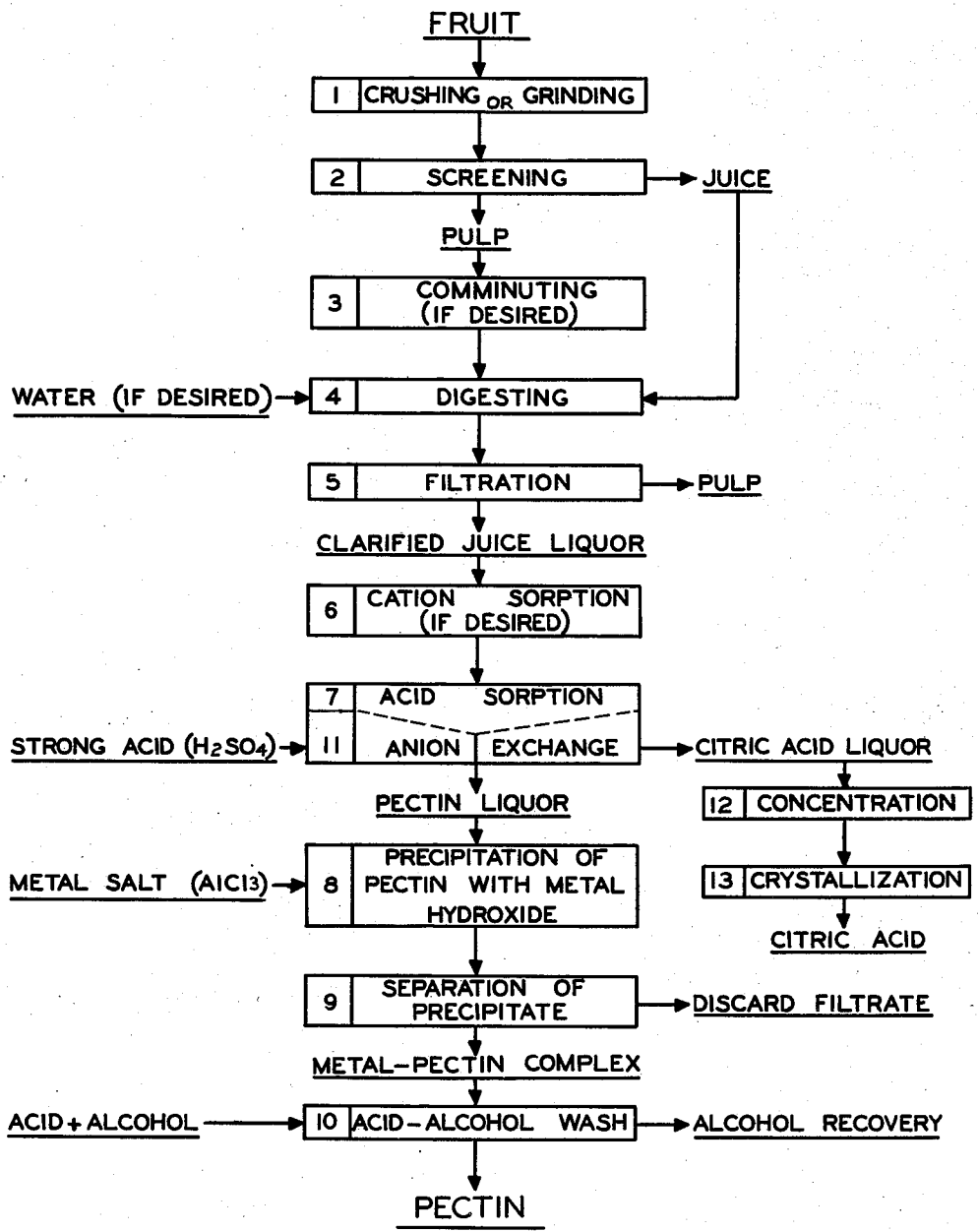

2,577,232

UNITED STATES PATENT OFFICE 2,577,232

PROCESS FOR OBTAINING PECTIN AND CITRIC ACID FROM THEIR SOURCE MATERIALS

Gordon Manley Cole, Corona, Calif., assignor to California Fruit Growers Exchange, Los Angeles, Calif., a corporation of California Application February 17, 1947, Serial No. 729,105

5 Claims. (Cl. 260—209.5)

This invention relates to new methods for the manufacture of pectin and citric acid. More specifically the invention relates to a process for the manufacture of pectin wherein the pectin is extracted from its source materials by means of an aqueous solution containing citric acid, and wherein the citric acid is then removed from the extract and the pectin is subsequently precipitated from the de-acidified extract by means of metallic compounds.

It is accordingly an object of this invention to provide a combined process for the recovery of pectin and citric acid from either a single natural source material, or a plurality of source materials.

A further object of the invention is to provide a method for preparing pectin whereby the pectin may be extracted from its source material by means of an aqueous citric acid solution and precipitated by means of a metallic compound.

Another object of the invention is to provide a direct method for recovering citric acid from a liquor or fruit juice containing pectic materials and citric acid.

Other objects and advantages of my process will be apparent to those skilled in the art as the invention is more specifically disclosed hereinafter.

The invention may be more readily understood by reference to the drawing, which shows a flow sheet which is a diagrammatic representation of a process comprising the main features of the invention. In the detailed description which follows, reference will be made to the steps outlined in the flow sheet.

EXAMPLES

As a preferred embodiment of my process, I give the following details of an example wherein the pectic source material consists of lemon pulp and the citric acid source material consists of lemon juice. I prefer to use lemons since they contain both pectin and citric acid in proportions well suited to my process.

The lemons, which should be clean and sound, are first crushed or ground coarsely (step 1) and the juice is pressed lightly from the pulp, for example, by a coarse screening or reeling (step 2). After the juice has been removed the pulp may be more finely ground, by passing the coarse pressed pulp through an ordinary screw type of grinder (step 3). A grinder with 1/8 inch holes in the face plate yields a satisfactorily comminuted pulp. These operations and the equipment for performing them may be more or less conventional and need not be described with any particularity. They are carried on under any convenient plant operating conditions and at prevailing temperatures.

The finely ground pulp is then remixed with its normal complement of lemon juice, resulting in a thick slurry (step 4). For this I employ any suitable tank, and I prefer one equipped with an agitator of moderate speed, so that the entire digestion batch may be adequately agitated, in order to ensure good extraction. To this, I add about 8 volumes of water for one volume of juice. This results in an extraction or digestion batch with its liquor having a pH of about 3.0. I then agitate the mixture of dilute lemon juice and pulp for about 60 minutes at about 90° C. (step 4). Any of the various means common in this art for heating may be employed.

At the end of the extraction period the juice extract is separated from the pulp by first draining or reeling to remove the coarser pulp articles and then filtering the liquid portion to remove the finer pulp particles (step 5).

In order to illustrate at this point, and following, some of the characteristics of these procedures, as well as to exhibit some modifications of the same, I will give hereinbelow in Tables I, II, and III complete details of three extractions prepared by procedures closely like the above, wherein, for the first steps, the specific conditions of extraction and the composition of the extracts were as set forth in Table I, which follows:

Table I

| Extraction Batch No. | 1 | 2 | 3 |
|---|---|---|---|
| Juice, Liters per kg. pulp | 0.5 | 0.5 | 0.6 |
| Water, Liters per kg. pulp | 4.0 | 4.0 | 4.9 |
| Extraction Temp. (°C.) | 90 | 99 | 99 |
| Extraction Time (Min.) | 60 | 90 | 60 |
| pH | 3.0 | 3.0 | 3.0 |
| Filtered Extract Vol., Liters per kg. pulp | 3.2 | 2.6 | 5.0 |
| Pectin Conc., Grams per liter | 4.6 | 7.4 | 4.7 |
| Citric acid, Grams per liter | 8.8 | 12.0 | 8.6 |

After the performance of step 5, the juice extract is ready to be treated for the removal of citric acid. This is done by passing the extract serially through a hydrogen exchange material (step 6) and then through an acid sorbing material (step 7). To obtain optimum yields of pectin of the best grade it is desirable to employ this treatment with hydrogen exchanger to remove metallic ions. The metallic ions are usually present as citrates and, since the precipitation of pectin by metallic salts is adversely affected by citrate ions, it is desirable to remove the metallic citrates as well as the citric acid. Furthermore, removal of the metallic cations prior to removal of the anions will avoid the occurrence in the effluent liquor of undesirably high alkalinities when the acid removal step is performed.

To illustrate further the removal of metallic ions, I give below in detail the results obtained when the lemon juice-pectin extracts prepared as set forth in Table I were percolated through beds of a resinous cation sorbing material (step 6). More specifically, the cation sorbing materials were of the hydrogen zeolite type which are capable of exchanging a hydrogen ion for a metallic ion. The specific conditions as well as the results of the procedures employed are set forth in the following table:

Table II

| Batch No | 1 | 2 | 3 |
|---|---|---|---|
| Vol. Liquor Perc'd, Liters per liter of bed vol | 4.71 | 7.71 | 21.0 |
| Influent Ash,[1] Grams per liter | 1.5 | 2.0 | 1.1 |
| Effluent Ash,[1] Grams per liter | 0.23 | 0.24 | 0.4 |
| Ash Sorbed,[1] Grams per liter of bed vol | 6.0 | 13.6 | 14.7 |

[1] Ash calculated as $CaCO_3$.

The effluents obtained from the cation sorber (Table II) were then percolated through beds of a resinous acid sorbing material (step 7). The liquors were percolated until substantially all of the citric acid had been removed. Tests indicated that the percent of citric acid, as anhydrous, remaining in the effluents after acid sorption amounted to less than about 0.03%. This corresponds, in a liquor of these particular characteristics, to a pH of about 5.5. The liquors before acid removal contained an average of about 1% of citric acid.

It should be noted that a pH of 5.5 is abnormally high for pectin liquors and hence, if it is desired to store such liquors for any length of time, they should be slightly acidified, say, to about pH 3 or 4 with an acid such as hydrochloric.

The three pectin liquors obtained as effluents from the acid sorption step (step 7) were treated by addition of aluminum chloride solution in quantity sufficient to precipitate pectin, and then with a suitable quantity of a 15% soda ash solution to bring the liquor back up preferably to a pH of 3.8 to 4.0 at which point precipitation occurs (step 8). The precipitates were filtered (step 9), ground, and washed with alcohol acidified with hydrochloric acid (step 10). These steps are performed in the usual way, by known means.

The dried products consisted of pectin of normal appearance and properties. The results of these procedures are tabulated in the following table:

Table III

| Batch No. | $Na_2CO_3 \cdot H_2O$, grams per liter | $AlCl_3 \cdot 6H_2O$, grams per liter | Acid-Alcohol washed, ppt. | | Setting Time (Seconds) | Per cent $-OCH_3$ [1] |
|---|---|---|---|---|---|---|
| | | | g./l.[1] | Grade[1] | | |
| 1 | 1.4 | 4.35 | 2.85 | 272 | 12 | 11.12 |
| 2 | 1.4 | 4.35 | 4.65 | 211 | 11 | 10.66 |
| 3 | 1.4 | 4.35 | 3.21 | 228 | 43 | 10.67 |

[1] Ash and moisture free.

The pectin prepared by this method is comparable in nearly all respects to the pectin prepared by sulfurous acid extraction of citrus pulp. The setting time is that of a normal rapid set pectin; the texture of the jelly is good or average in most cases and the jelly grade is high.

Citric acid extracted pectin may be further treated with acid to produce a slow setting pectin, or may be treated with alkali or otherwise to produce a low methoxyl pectin which is capable of jelling an aqueous medium in the absence of sugar.

The citric acid was displaced from the charged acid sorber beds with 5% sulfuric acid (step 11). The citric acid effluent was collected in each run until tests upon fractions thereof indicated that no citric acid was being displaced from the column. The last portions, which contain considerable sulfuric acid and little citric acid, are used at the beginning of the next run. In this manner an effluent is obtained which upon concentration (step 12) and crystallization (step 13) yields practically pure citric acid.

It was found that the citric acid liquors recovered contained a total of about 94% of the citric acid contained in the effluents from the cation sorber.

The procedures I have outlined above are given as examples and should not be interpreted as limiting the scope of my invention. Various modifications may be made throughout the process, as will be obvious to those skilled in the art. Some of these possible variations will be hereinafter set forth.

GENERAL CONSIDERATIONS

In nearly all methods for preparing pectin which are now in use, the pectic source material such as citrus peel or apple pomace is treated and extracted with an aqueous acidic solution. This treatment solubilizes a major portion of the insoluble pectic materials which are naturally present in the source material. The acidic aqueous extract is then treated to precipitate the pectin. This precipitation has been accomplished in the past in a number of different ways. For instance, the pectin may be precipitated by the addition of alcohol. This process is expensive and, in addition, does not produce a pure pectin, but one which may be and usually will be contaminated with other alcohol precipitable constituents of the source material, such as proteins.

Another process involves the precipitation of pectin directly from the extraction batch by addition of a metal salt which hydrolyzes in the aqueous medium to form a colloidal hydroxide. This colloidal hydroxide, according to present theories, flocculates the pectin, which is precipitated as a gelatinous mass. The method is generally preferable to and more economical than the alcohol precipitation process. I have found, however, that this precipitation with a metal salt such as aluminum chloride or aluminum sulfate is remarkably sensitive to citrate ions. The citrate ion apparently forms a soluble or dispersible complex with the aluminum salt, which complex is stable and is not effective to precipitate pectin. This is the reason it has been, empirically, the practice to avoid, as far as possible, the occurrence of citric acid and citrates in the extraction batch when this method was to be utilized.

The disadvantages in endeavoring to avoid the citrate ion are, however, at least threefold: (1) Citrus source materials always contain some citric acid or citrates which must be eliminated, as far as possible, by an extra purification step before the precipitation of pectin with a metal salt. This is usually done by a water washing of the source material prior to the acid extraction of the pectin. This washing step has heretofore caused loss of the citric acid and citrates which it thus removed, since the great dilution rendered any attempted recovery prohibitively expensive. (2) This washing step is quite generally incapable of removing all citrate ion. No method has been known prior hereto that is capable of removing citrates as completely as I have now established would be desirable. (3) Citric acid is actually an advantageous extractant for insoluble natural pectic materials. When it was believed that citrate ion had to be avoided in the process, a strong acid was used in the extraction step, such as sulphurous or hydrochloric acid, the anion of which did not interfere with the precipitation step. While these acids will rapidly solubilize and extract pectin from pectic source materials, they also have a strong tendency to lower the jelling power or grade of the pectin. Citric acid, on the other hand, will solubilize the pectin almost as efficiently as a strong acid and, in addition, yields a pectin of very high jelly grade. It is, therefore, highly advantageous to use citric acid in the extraction step. Now, at the same time, its disadvantageous results in the precipitation step are overcome. By my improved process all of the above disadvantages are overcome; there is no need for separate washing steps to remove citrate ions from the source material, and it is not necessary to use strong acids such as sulfurous or hydrochloric.

Another advantage of my process lies in the almost complete recovery of citric acid in pure form which is made possible. In the citric acid field a method has long been sought whereby pure citric acid could be obtained by direct crystallization from lemon juice. Commercial methods now in use require long storage of the juice to permit enzymic decomposition of the gummy pectinous materials, neutralization of the fermented liquor with lime to produce calcium citrate, recovery of the latter by filtration, decomposition of the calcium citrate with sulfuric acid to produce calcium sulfate and citric acid liquor, and finally purification of the liquor and crystallization of the citric acid therefrom. According to my process pure citric acid is produced without the necessity for any of the above steps other than the final crystallization.

MODIFICATIONS AND AMPLIFICATIONS

The raw materials used in my process may consist of various natural source materials for pectin and citric acid. Generally it will be found that my process is best adapted for use in localities where a source of pectin and a source of citric acid are brought together, usually at a fruit processing plant. Pectin exists in large quantities in the peel and pulp of citrus fruits and in apples, and in smaller quantities in sugar beets and pineapple. The citrus fruits and pineapples also contain considerable quantities of citric acid. Pineapples, however, contain only small amounts of pectin, and sugar beets are only a potential source of jellifying pectin. Citric acid and pectin may be recovered from any such source materials which contain sufficient of both pectin and citric acid to make the process economically feasible. It is not essential that the citric acid and pectin both originate in the same raw material.

Generally it may be stated that the practical choice of source material for both pectin and citric acid rests largely upon considerations of economy. Purely from the theoretical standpoint, however, it is clear that any pectic source material may be used together with any crude or unpurified or partially purified citric acid liquor, solution, or juice.

Step 1

Instead of the crushing or grinding specifically employed in this step, any equivalent procedure for effectively freeing the juice present within the starting or source material may be substituted. For example, when working with citrus fruit, a reaming or burring operation, whether performed mechanically or by hand, serves admirably to free the juice. Other types of devices perform equivalent functions.

Step 2

Any type of draining may replace the screening or reeling. In various mechanical contrivances for separating the juice of citrus fruits from the peel, including those that employ reaming, pressure, or other means, the juice is usually discharged at one place from the machine and the peel at another. Where adequate screening of the juice is provided for, such a device may be made to perform both step 1 and step 2.

Step 3

It is not essential that the pulp be finely ground but I have found that pectin extraction proceeds more rapidly and efficiently if the pulp is rather finely ground, thus permitting ready accessibility of the pulp to the juice. A variety of means for accomplishing this result will occur to persons skilled in this art. One such to which I desire to direct attention is comprised essentially of two sets, intermeshed, of closely spaced cutting wheels or saws. The operation of this device produces from citrus peel relatively long but thin slices or shreds that have been found in practice to be very satisfactory for the extraction of pectin.

As a matter of fact, where one wishes to forego all treatment or manipulation of either the juice or the pulp between steps 2 and 4, such as a further screening or filtering of the juice or recovery of oil therefrom or a preliminary rinsing of the peel or pulp, one may consolidate steps 1, 2, and 3 by passing, say, fresh lemons directly through such a shredding device.

Step 4

In processing citrus fruit it may be found that more pectic source material becomes available than can be extracted with the citric acid available from that source material. In this case the citric acid liquors recovered may be recycled to the extraction step and again used to extract pectin from fresh source material. By operating in this manner pectin may be extracted from source materials originally containing little or no citric acid. On the other hand, if it is found desirable to recover the citric acid as it is displaced from the acid sorbing material, the deficiency of citric acid in the raw material may be made up by adding another acid such as sulfuric, hydrochloric, or sulfurous acid to carry out the extraction. If such an acid is used it will also be sorbed, along with the citric acid, by the acid sorber. The principal effect of this is merely to lower the capacity of the acid sorber for citric acid, the stronger acid being preferentially sorbed, and the citric acid being preferentially displaced.

While it is entirely possible to use previously purified citric acid as the extractant, it will generally be found that the advantages to be gained thereby do not warrant the expense, and, furthermore, the full object of my invention will not be achieved thereby. For this reason, I prefer to use citric acid in a crude or unpurified or partially purified form, such as would ordinarily be discarded or separately refined to obtain the citric acid. Such materials include, for example, lemon juice or pineapple juice. Frequently such juices are used as a source of citric acid only when they are of such quality as not to be suitable for beverage purposes. I have found that this type of juice may very suitably be used as the principal or sole solubilizing agent to extract pectin from its source materials. It will be observed that in the specific examples I have indicated the addition of considerable water with or to the lemon juice. This is for the reason that, in a mixture comprised of the comminuted pulp of lemon with its juice, although adequate acid may be present, the proportion of liquid in such a mixture is ordinarily not great enough to extract the pectin with maximum efficiency. Thus it will be seen that some dilute citric acid juices or liquors may be of such strength as to be suitable for use directly. Other more dilute citric acid liquors, which may not be of sufficient strength for this purpose or from which it is ordinarily not economically feasible to recover the acid, may possibly be supplemented with a stronger juice or liquor, or with acid, and used as the extractant.

The juice which has been expressed from the pulp in step 1 of my process may, if desired, be treated to remove and recover the essential oil before it is remixed with the pulp at step 4. When whole fruit is macerated, as in the first step of this process, the essential oil contained in the peel becomes partially dispersed in the form of small droplets in the aqueous phase. Since the specific gravity of the oil is less than that of the aqueous phase, satisfactory separation of the oil may be obtained by passing the juice liquor through a centrifuge. Such a procedure, in addition to recovering the oil as a valuable by-product, also is advantageous in that it eliminates the possibility of the oil droplets becoming deposited upon the cation exchanger or the acid sorbing material, thus reducing the efficiency of these materials and necessitating frequent shutdowns for cleaning.

Satisfactory extraction of the pectin in step 4 is dependent upon several interrelated variables. These variables include temperature, time of extraction, pH of the liquor, size of the pulp particles and the degree of agitation employed. The governing principles are that these variables should be so adjusted that a reasonably complete and efficient extraction may be obtained without unduly degrading the pectin. Temperatures above 100° C. will ordinarily not be employed since pectin is rapidly degraded at those temperatures. The most practical temperatures range between about 70° C. and about 100° C. Prolongation of the time of extraction will be found to result from use of lower temperatures, if effort is made to achieve relatively complete extraction.

The pH of the extraction liquor should preferably be between about 2.0 and about 3.5. At a pH either appreciably above or appreciably below this range it will generally be found that, at any practical extraction time and temperature, the jelling power of the pectin will be reduced. If the temperature and the pH are maintained approximately within the above ranges, the major part of the pectin will be extracted in from about ½ hour to about 2 hours. The finer the material is ground, the faster and more complete will be the extraction. However, if it is ground too finely, other disadvantageous results may follow, such as difficulty in filtering or separating the pulp particles from the liquor.

Step 5

Numerous suitable means are known by which the residual pulp may be separated from the extraction liquor or juice, and all are within the purview of my proposed procedures.

The yields of pectin and citric acid may be increased by extracting the pulp with further small quantities of water, which may be filtered off and added to the filtered juice. A procedure which I have found to be particularly advantageous consists in treating the filtered pulp with about three separate portions of water, the first of which is added to the original juice filtrate and the second and third of which are used to make up the first and second washings of a succeeding pulp batch. Such a procedure may be carried on continuously, treating each pulp batch with successive small quantities of the succeeding extract from a preceding run. By operating in this manner, an efficient extraction of pectin may be accomplished without unduly diluting the first juice extract, since only the second extract need be added thereto.

Step 6

For removing metallic ions, I may use any of the well known materials which are water insoluble and are capable of exchanging a hydrogen ion for a metallic ion. In particular, I may use the carbonaceous hydrogen zeolites such as those described in the Transactions of the American Society of Mechanical Engineers for May 1938, pages 315-325, or any of the various phenolic-aldehyde resins or phenol sulfonic acid-aldehyde resins. These materials are capable of exchanging a hydrogen ion for a metallic ion even though the percolating solution is already fairly concentrated with acid. I have found that solutions having a pH as low as 1.0 are still capable of exchanging metallic ions for hydrogen ions. The metallic citrates are thus converted to citric acid, which in turn is later removed by the acid sorbing material.

In the utilization of these ionic exchange materials such as the carbonaceous hydrogen zeolites, I at present regard it as a preferred practice to pass the liquor through a bed of the material. However, it is not essential that this be done. The important thing is to bring the liquor and the treating material into intimate contact. This may be done, for example, by mixing the material with the liquor and then removing it therefrom, as by means of screening, reeling, centrifuging, filtering, or the like. Naturally, in any such process due regard must be had of the frangibility of the ionic exchange material.

Whenever in the use of these materials, tests show that substantial quantities of the cations which it is desired to remove are, in fact, coming through in the treated liquor, the treating step with that material should be discontinued. The material may be regenerated and its ability to exchange hydrogen ions for other cations renewed by thoroughly washing it with a strong acid, as, for example, an aqueous solution of a mineral acid. The material will then be carefully rinsed in order to avoid introduction of the regenerating acid into a subsequent acid sorption step.

Step 7

The acid sorbing material used may be any of the well known anion exchange materials, so called. For example, m-phenylene diamine-formaldehyde resins, aniline-aldehyde resins, guanidine-formaldehyde resins, dicyandiamide resins, as well as certain insoluble metallic oxides, may be used. In general any material which is insoluble under the necessary conditions, and which will remove acids from aqueous solution may be used.

The capacity of these acid sorbing materials for citric acid is considerable; in some instances it may run as high as about 120–150 grams of citric acid per liter of acid sorber. As the acid extract is percolated through the anion exchanger, the bed becomes progressively saturated with citric acid, with a consequent gradual increase in hydrogen ion concentration of the effluent. The effluent at the start of a run will have a pH of about 7.0 to 7.5. When the pH reaches about 5.5 it is desirable to re-percolate the effluent through a fresh bed of acid sorbing material, if complete recovery of citric acid is desired and for maximum efficiency of the subsequent pectin precipitation.

I desire at this point to call attention to an interesting and useful phenomenon. Lemon juice extracts contain a natural indicator which reflects decreasing pH of the liquor and, hence, this natural indicator may be used to indicate the point at which the liquor should be recirculated. As the acid sorbing ability of the exchanger begins to be used up, the pH of the effluent will begin to drop. When the pH falls to about 5.5, a darkening of the liquor is observed. After reaching approximately this point, the pH drops rather abruptly. At about 3.3 the dark color again disappears. For complete removal of citric acid it is desirable to recirculate the liquor soon after it begins to turn dark, preferably through a fresh bed of acid sorber to be used in another run.

In order to obtain satisfactory precipitation of pectin from the deacidified liquor by precipitation with metal salts, it is essential that the citrate ion be reduced to a minimum, and preferably be removed substantially entirely. I have found that, in general, no pectin can be precipitated from liquors containing more than about 0.25% of citric acid, calculated as anhydrous, if normal quantities of the precipitating salts are used. Even at concentrations of citrate ion as low as about 0.15%, precipitation will, in most cases, take place only slowly and incompletely. The maximum percent of citrate ion which is tolerable in the precipitation step varies considerably with the particular pectin liquor. The factors which influence this variability are not known with certainty. In all liquors, the restraining action of citric acid or citrate ion is progressive, small quantities causing a slow and incomplete precipitation, and larger quantities preventing any precipitation at all. In general it may be stated that the percent of citric acid or total citrate ion in the liquor must be reduced at least to below about 0.25%, and in most cases preferably to below about 0.08%, in order to obtain completely satisfactory recovery of the pectin actually present in the liquor without using excessive and wasteful quantities of reagents.

Step 8

The deacidified juice liquor from the acid sorber (step 7) consists of a pectin liquor containing little or no citric acid or citrate ion and is usually ready to be treated directly for the recovery of pectin. The procedure from this point for recovering pectin from the liquor may be substantially the same as that set forth in U. S. Patent No. 1,497,884 to Jameson et al., or preferably, the improved process set forth in U. S. Patent No. 2,300,651 to Cole and Holton. Essentially, the pectin recovery process consists in subjecting the pectin liquor to the action of a colloid having a charge opposite to the charge of the colloidal pectin. The charge on the colloidal pectin is thus neutralized and the pectin precipitates as a flocculent mass together with a small proportion of the precipitating colloid.

The precipitating agents which I prefer to use are those metal salts or compounds which, even in slightly acid solution, partially hydrolyze to form a colloidal metal hydroxide having a charge opposite to the colloidal pectin particles. Examples of such salts are the sulfates, acetates, and chlorides of aluminum or iron.

Other heavy metal salts such as copper salts, may also be used, although their precipitating action upon the pectin appears to result from the formation of insoluble metal pectinates instead of the colloidal flocculation which occurs with aluminum or iron salts.

Step 9

After precipitation, the pectin-metal complex is filtered, centrifuged, or otherwise separated from the mother liquor, and as much water as desired is pressed from the precipitate.

Step 10

The complex is washed with an acidified alcoholic solution to solubilize and remove the metal hydroxide. The alcohol wash also serves to remove natural coloring material which is usually present in the crude precipitate. Upon drying and grinding the washed pectin, a good grade of pectin is obtained which will produce a clear, colorless jelly.

Step 11

The citric acid may be displaced from the acid sorber with any strong acid such as sulfuric, hydrochloric, or phosphoric acids. Any acid stronger than citric acid may be used. For my purposes I prefer to use, as stated previously, a 5% sulfuric acid solution. Stronger acid solutions may be used, but I have found that the more concentrated acids are not as efficient in displacing citric acid from the bed as the relatively weak 5% acid. If concentrated acids are used, the effluent will normally contain a higher proportion of strong acid to citric acid than in the case of a more dilute acid. Of course, if any effluent is found to contain undesirable quantities of strong acid, it may be percolated as the first liquor through a citric acid charged bed ready to be regenerated, thus eliminating the last traces of strong acid from the effluent.

When all the citric acid has been displaced from the acid sorbing material with sulfuric or other strong acid it is necessary to regenerate the bed with a base. For this purpose I prefer to use sodium hydroxide or sodium carbonate solution.

Steps 12 and 13

The citric acid liquors obtained by displacement are generally of such purity that they may be directly concentrated by evaporation, according to known methods, until crystalline citric acid is obtained. The crystals may be of any desired size, depending upon the degree of agitation employed.

If it is desired to produce sodium citrate instead of citric acid, the citric acid charged bed may be regenerated directly with sodium hydroxide or sodium carbonate. In this case the regenerant effluent is simply evaporated and crystallized to obtain pure sodium citrate.

COMMENTS

The various materials known in the art, some of which have been referred to hereinbefore, which are capable of removing cations or anions from solutions are often called "cation exchangers," or "anion exchangers." Also, they are often loosely spoken of as cation or anion "adsorbers," or "absorbers." In the foregoing description and in the appended claims, I have preferred not to use any of these terms, since in many instances they appear to be misdescriptive. For example the well kown aminealdehyde resins, in their basic form, do not "exchange" anions; they appear to combine chemically with the whole acid molecule to form an amine salt type of product. To refer to such a reaction as an "adsorption" of acid would likewise be misleading since this term seems to be restricted to the physical accumulation or "occlusion" of gases or solutes in thin layers upon the surfaces of a solid. The term "absorption," on the other hand, implies a soaking up of the ions or solutes into the interior of a particle. In other instances the exact mechanism by which an anion or cation may be removed is not known.

For all the above reasons I have preferred to use the general term "sorber" in describing the acid or metal removing materials. This term is intended to include any of the materials which will sorb, or remove from solution, acids or metals, as the case may be, whether the mechanism of sorption consists of an "exchange" of ions, a chemical combination, an "adsorption" or "absorption" of ions or solute, or any combination of those mechanisms.

Having now described my invention in such full, clear, and exact manner as to enable others skilled in the art to practice the same, I claim as my invention:

1. A process for preparing pectin by a citric acid extraction process which comprises digesting comminuted lemon pulp with an aqueous mixture comprising lemon juice, said lemon juice being present in amounts sufficient to extract the pectin from the source material, separating the extract from the residual pulp, passing said extract first through a cation sorbing material capable of removing metallic cations from citric acid solutions and then through an acid sorbing material consisting essentially of an insoluble polyamine resin to remove substantially all of the citrate ions, and finally treating the extract with a polyvalent metallic salt to precipitate pectin therefrom in the form of a water-insoluble pectin-metal complex.

2. A process for preparing pectin which comprises treating a pectinous source material with an aqueous mixture comprising citric acid and soluble salts thereof, said citric acid being present in amounts sufficient to solubilize and extract the pectin from said source material, separating the resultant pectin extract from the residual pulp, passing said extract first through a cation sorbing material capable of removing metallic ions from citric acid solutions and then through an acid sorbing material consisting essentially of an insoluble polyamine resin to remove substantially all of the citrate ions, and finally treating the extract with a polyvalent metallic salt to precipitate pectin therefrom in the form of a water-insoluble pectin-metal complex.

3. A process for preparing pectin by a citric acid extraction process which comprises treating comminuted citrus fruit pulp with an aqueous mixture comprising citric acid and soluble salts thereof, said citric acid being present in amounts sufficient to extract the pectin from the source material, separating the pectin extract from the residual pulp, passing said extract first through a cation sorbing material capable of removing metallic ions from citric acid solutions and then through an acid sorbing material consisting essentially of an insoluble polyamine resin to remove substantially all of the citrate ions, and finally treating the extract with a polyvalent metallic salt to precipitate pectin therefrom in the form of a water-insoluble pectin-metal complex.

4. A process for preparing pectin from lemon pulp which comprises digesting comminuted lemon pulp with an aqueous mixture comprising lemon juice, said lemon juice being present in amounts sufficient to extract the pectin from the source material separating the extract from the residual pulp, passing said extract first through a cation sorbing material capable of removing metallic ions from citric acid solutions, and then through an acid sorbing material consisting essentially of an insoluble polyamine resin whereby the percentage of citrate ions in the extract is reduced at least to below about 0.25%, and finally treating the extract with a collodial, polyvalent metal hydroxide to precipitate pectin therefrom in the form of a water-insoluble pectin-metal complex.

5. A process for preparing pectin by a citric acid extraction process which comprises treating comminuted citrus fruit pulp with an aqueous mixture comprising citric acid and soluble salts thereof, said citric acid being present in amounts sufficient to extract the pectin from the source material, separating the pectin extract from the residual pulp, passing said extract first through a cation sorbing material capable of removing metallic ions from citric acid solutions and then through an insoluble acid sorbing material to remove substantially all of the citrate ions, and finally treating the extract with a polyvalent metallic salt to precipitate pectin therefrom in the form of a water-insoluble pectin-metal complex.

GORDON MANLEY COLE.

REFERENCES CITED

The following references are of record in the file of this patent:

UNITED STATES PATENTS

| Number | Name | Date |
|---|---|---|
| 1,385,525 | Doell et al. | July 26, 1921 |
| 1,808,737 | Loesch | June 2, 1931 |
| 2,253,061 | Cole | Aug. 19, 1941 |
| 2,273,521 | Hirsch | Feb. 17, 1942 |
| 2,323,483 | Myers et al. | July 6, 1943 |
| 2,392,854 | Leo et al. | Jan. 15, 1946 |